US007398834B2

(12) United States Patent
Jung et al.

(10) Patent No.: US 7,398,834 B2
(45) Date of Patent: Jul. 15, 2008

(54) HAMMER DRILL WITH SELECTIVE LOCK-ON

(75) Inventors: Achim Jung, Armsheim (DE); René Jäger, Karben (DE); Ralf Seebauer, Selters (DE)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 11/360,062

(22) Filed: Feb. 23, 2006

(65) Prior Publication Data

US 2006/0185866 A1 Aug. 24, 2006

(30) Foreign Application Priority Data

Feb. 24, 2005 (GB) ................................ 0503784.1

(51) Int. Cl.
*B23Q 5/00* (2006.01)
*B25D 16/00* (2006.01)
*E02D 7/02* (2006.01)

(52) U.S. Cl. .............................. 173/4; 173/11; 173/48; 173/117; 173/216; 173/217; 388/937

(58) Field of Classification Search ..................... 173/2, 173/4, 20, 11, 47, 48, 216, 217, 104, 109, 173/117; 388/937
See application file for complete search history.

(56) References Cited

U.S. PATENT DOCUMENTS 3,774,699 A * 11/1973 Schmuck ..................... 173/48
3,847,233 A 11/1974 Glover et al.
3,854,020 A 12/1974 Glover et al.
4,879,438 A 11/1989 Winchester
5,105,130 A 4/1992 Baker et al.
5,360,073 A * 11/1994 Akazawa ..................... 173/15
5,806,609 A 9/1998 Stock et al.
6,109,364 A 8/2000 Demuth et al.
6,176,321 B1 1/2001 Arakawa et al.
6,355,892 B1 3/2002 Marks
6,469,269 B1 10/2002 Jung
6,550,545 B1 4/2003 Manschitz et al.
6,725,944 B2 4/2004 Burger et al.
6,766,868 B2 7/2004 Frauhammer et al.
6,868,919 B1 3/2005 Manschitz et al.
2003/0121678 A1 7/2003 Manschitz et al.

(Continued)

FOREIGN PATENT DOCUMENTS

GB 2 285 764 7/1995

(Continued)

*Primary Examiner*—Stephen F Gerrity
(74) *Attorney, Agent, or Firm*—Michael P. Leary; Adan Ayala

(57) ABSTRACT

A hammer drill comprising: a motor; a drive transmission capable of operating in at in at least a rotary mode and a reciprocating mode; a mode change mechanism; a switch which, when closed, provides power to the motor; and a mechanical lock-on mechanism which, when locked mechanically holds the switch closed to maintain the power to the motor. Additionally, the hammer drill includes a first sensor, which indicates the mode of operation of drive transmission; and a second sensor which indicates whether the lock-on mechanism is locked; and a controller which is capable of interfering with the operation of the motor, when the controller detects that the drive transmission is in the rotary mode of operation and the lock-on mechanism has been locked.

16 Claims, 4 Drawing Sheets

U.S. PATENT DOCUMENTS

| | | | | |
|---|---|---|---|---|
| 2004/0003930 | A1 | 1/2004 | Meixner et al. | |
| 2004/0112615 | A1 | 6/2004 | Mayr et al. | |
| 2004/0200628 | A1 | 10/2004 | Schmitzer et al. | |
| 2005/0103510 | A1 * | 5/2005 | Gass et al. | 173/217 |
| 2005/0150669 | A1 * | 7/2005 | Umemura et al. | 173/48 |
| 2006/0060365 | A1 * | 3/2006 | Kunz | 173/48 |
| 2006/0185865 | A1 * | 8/2006 | Jung et al. | 173/48 |

FOREIGN PATENT DOCUMENTS

| | | | |
|---|---|---|---|
| GB | 2 314 288 | A | 12/1997 |
| IT | 1210884 | B | 9/1989 |

* cited by examiner

HAMMER DRILL WITH SELECTIVE LOCK-ON

FIELD OF THE INVENTION

The present invention relates to hammer drills which are capable of being operated in at least two modes of operation, in particular, a hammer drill which has a hammer only mode, and more in particular, to hammer drills which are capable of being operated in three modes of operation, one being hammer only mode, the second being drill only mode and the third being a combined hammer and drilling mode.

BACKGROUND OF THE INVENTION

Hammer drills are power tools that generally have three modes of operation, i.e. a hammer only mode, a drill only mode and a combined hammer and drilling mode. In general, the motor of a hammer drill is operated by the user depressing a spring-loaded trigger, and deactivated by the user releasing the trigger such that it is necessary to hold the trigger down during operation of the tool.

U.S. Pat. No. 6,109,364 describes a rotary hammer drill which has three modes of operation, namely a purely drilling mode, a purely hammering mode and a combination of drilling and hammering mode. A mechanism is provided by which the rotary hammer can be switched between the three modes of operation.

It is desirable for such tools to be able to be "locked on" in the pure hammering mode only. This means that when the pure hammer mode is selected and the trigger button is depressed, the hammer can be "locked on" so that the removal of the fingers from the trigger button does not cause the tool to switch off but it in fact continues operating within the pure hammer mode until the "lock on" mechanism is deactivated. However, it is undesirable that such a feature is capable of being activated when in either the rotary only mode of operation or in the combination of the rotary and hammering mode of operation. Therefore, rotary hammers are constructed so that they can only be "locked on" when in the pure hammer mode only. GB2314288 describes one such mechanism whereby the trigger button is mechanically locked on in the hammer only mode.

The present invention provides an alternative design to the "lock on" mechanism in GB2314288.

BRIEF SUMMARY OF THE INVENTION

Accordingly there is provided a hammer drill comprising:

a motor;

a tool holder capable of holding a cutting tool;

a drive transmission, capable of operating in at least two modes of operation, which, when a cutting tool is held by the tool holder, is capable of converting the drive output of the motor into a rotary drive for the cutting tool and/or repetitive impacts which are imparted to the cutting tool 8 depending on the mode of operation of the drive transmission;

a mode change mechanism which is capable of switching the drive transmission between the at least two modes of operation;

a switch which, when activated, provides power to the motor; and a lock on mechanism which, when activated, locks the switch in its activated state to maintain the power to the motor;

characterised in that there is further provided:

a first sensing apparatus which indicates the mode of operation of drive transmission;

a second sensing apparatus which indicates whether the lock on mechanism has been activated; and a controller which is capable of interfering with the operation of the motor when power is provided to it by the switch and which monitors the signals from the first and second sensing apparatuses wherein, when the controller detects that the gear transmission is in at least one certain predetermined mode of operation and the lock on mechanism has been activated, it interferes with the operation of the motor.

In the proposed new design, the switch will be capable of being locked on in any mode of operation. However, when the rotary hammer is in certain predetermined modes of operation, such as, either pure drilling mode or combination drilling and hammering mode, the sensing apparatus will detect when an operator tries to "lock on" the hammer and deactivate or at least interfere with the running of the motor, for example by altering at least one of the amperage, the voltage, and the frequency of the electric current to the motor.

It will be appreciated that the drive transmission can be moved into the certain mode of operation or one of the several certain modes of operation and the lock on mechanism can be activated in any order, or simultaneously, prior to and in order for the controller to interfere with the operation of the motor.

It will also be appreciated that the first and second sensing apparatuses can either be single sensors or a plurality of sensors. Furthermore, the signals generated by the first and second sensing apparatuses can be transmitted to the controller using mechanical method or electrical, optical or radio signals or any other suitable method of transmission.

BRIEF DESCRIPTION OF THE DRAWINGS

The lock on system according to the present invention will now be described with reference to the accompanying drawings of which.

DETAILED DESCRIPTION OF THE INVENTION

Figure 1:
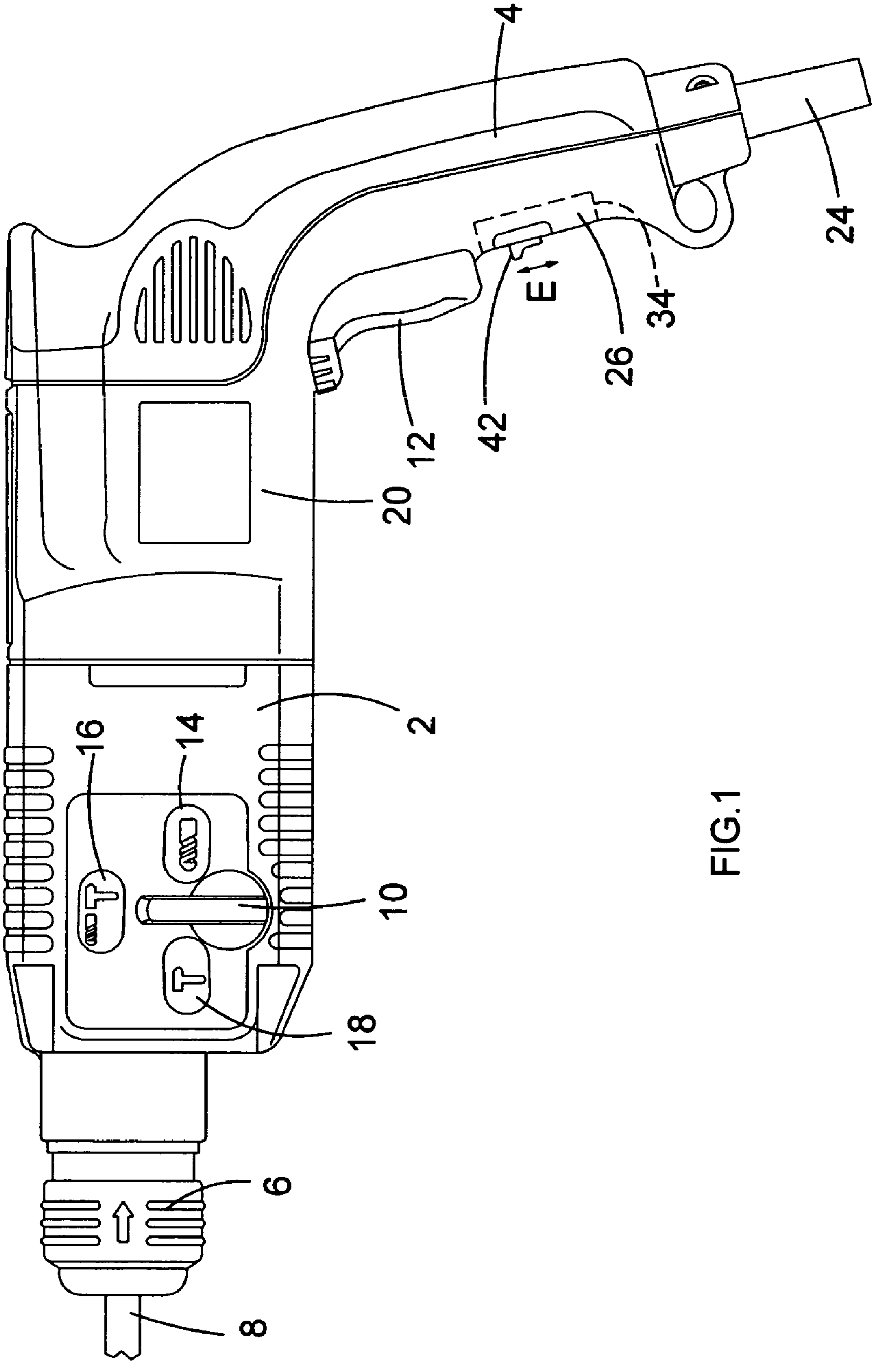
FIG. 1 shows a side view of a hammer drill.
Figure 2:
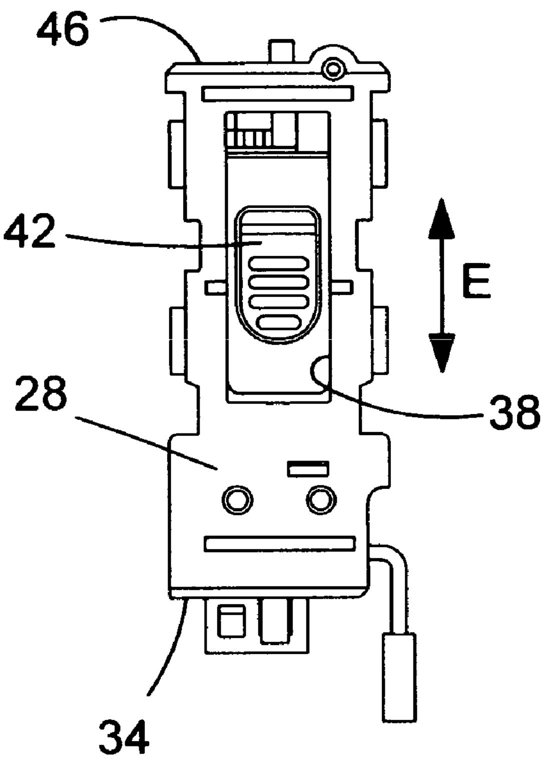
FIG. 2 shows a plan view of the latch mechanism.
Figure 3:
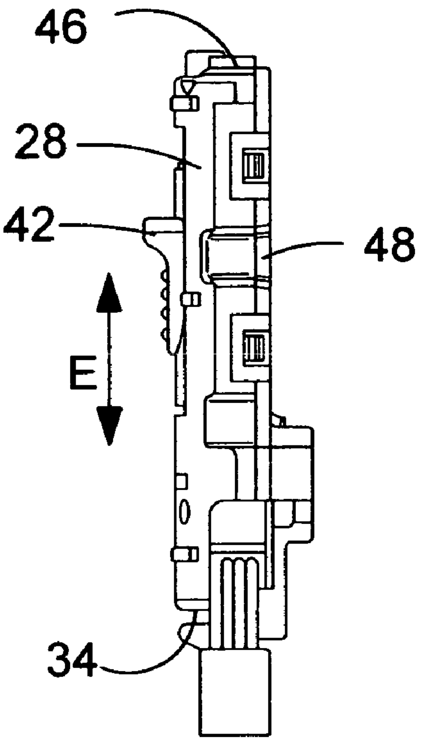
FIG. 3 shows a side view of the latch mechanism.
Figure 4:
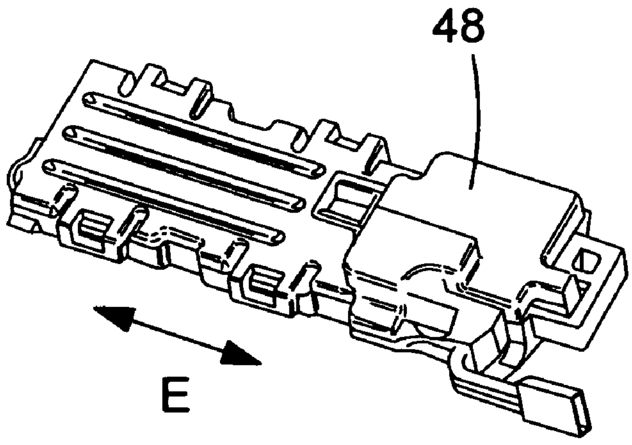
FIG. 4 shows a perspective view of the latch mechanism.
Figure 5:
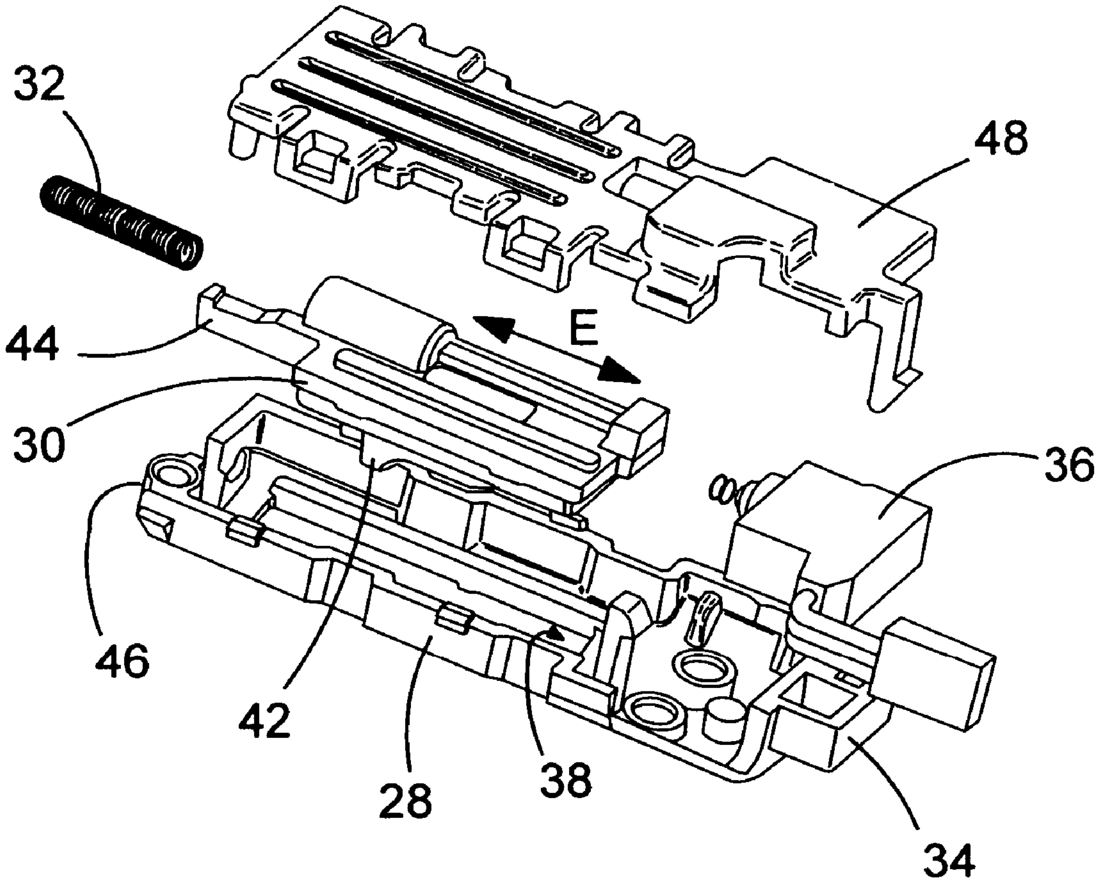
FIG. 5 shows an exploded view of the latch mechanism.

Referring to FIG. 1, the hammer drill comprises a body 2, having a handle 4 attached to its rear. A tool holder 6 is mounted on the end of a spindle (not shown) on the front of the body 2 and which drivingly supports a drill bit 8 in well known manner. A motor 20 is mounted within the body 2 which drives the hammer drill. The motor is powered by a mains electricity supply which is supplied to the hammer drill via an electric cable 24.

The hammer drill can operate in three different modes of operation. In the first mode, the motor rotatingly drives the spindle, which in turn drives the tool holder 6, which in turn rotatingly drives the drill bit 8. This is referred to as drill only mode. In the second mode, the motor reciprocatingly drives a ram (not shown) which is slideably mounted within the spindle and which repetitively strikes the end of the drill bit 8 via a striker (not shown). This is referred to as hammer only mode. In the third mode, the motor rotatingly both drives the spindle, which in turn drives the tool holder 6, which in turn rotatingly drives the drill bit 8, and reciprocatingly drives the ram, which is slideably mounted within the spindle and which repetitively strikes the end of the drill bit 8 via the striker. This is referred to as the combined hammer and drilling mode.

The mechanisms by which a hammer drill is able to perform the three modes of operation and is able to be changed between the three modes of operation are well known in the art and as such, are not described in any further detail.

The mode of operation of the hammer drill as shown in FIG. 1 is altered by adjusting a knob 10 to select one of the three modes of operation 18, 14, 16 and then depressing the trigger button 12 which activates an electric motor 20 to drive the tool within that mode of operation. The release of the trigger button 12 cuts the power to the motor 20 and thus stops the tool from operating.

Figure 6:
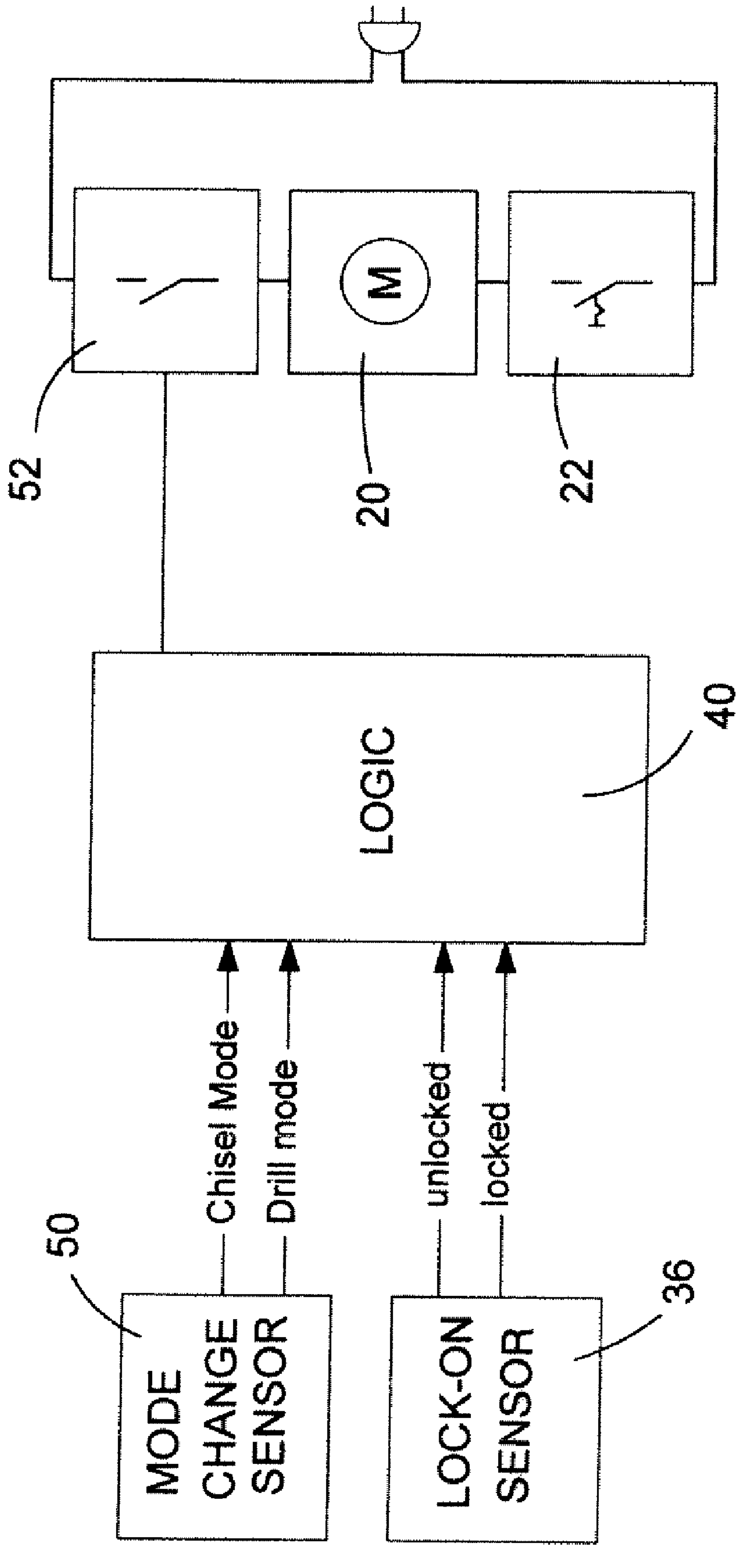
FIG. 6 shows a circuit diagram of the lock on system.

The electrical circuit which provides power to the motor 20 comprises an electrical switch 22, which, is mechanically connected to the trigger button 12, and a control switch 52 which switches are both in series with each other and the motor 20 (as best seen in FIG. 6). The control switch 52 is operated by a controller 40. The control switch 52 is normally maintained in a closed position allowing current to pass through it. Therefore, depression of the trigger button 12 closes the electric switch 22 allowing current to pass through it and thus activate the motor 20 (as the control switch is normally closed).

The three modes of operation are the drill only mode 14, the combined hammer and drilling mode 16 and the hammer only mode 18.

FIGS. 2 to 5 show the latch mechanism. The latch mechanism 26 comprises a casing 28 in which is slideably mounted a slider 30. The slider can slide in the direction of arrow (E) within the casing 28. A spring 32 biases the slider 30 towards the bottom end 34 of the casing 28. Mounted within the casing 28 towards the bottom end 34 is a micro-switch 36. When the slider is allowed to travel under the biasing force of the spring 32 to its maximum extent within the casing 28, it engages with the micro-switch 36 and switches it on. The micro-switch is electrically connected to the central control unit 40 and sends a signal to the control unit 40 indicating whether it is switched on or off. An elongate slot 38 is formed within the casing 28. A finger pad 42 is integrally formed with the slider 30 and when the slider is located within the casing 28, projects through the elongate slot 38. A user of the power tool can slide the slider 30 within the casing 28 by placing their finger on the finger pad 42 and sliding it along the length of the elongate slot 38. Formed on one end of the slider 30 is a latch 44 which, when the slider 30 is slid to its maximum extent to the top end 46 the casing 28 projects through a hole formed in the top end 46 of the casing. The casing 28 is sealed with a lid 48 which keeps the slider and micro-switch and spring within the casing.

The latch mechanism 26 is located within the handle 4 of the rotary hammer below the trigger button 12 (see FIG. 1). The finger pad 42 projects through a hole formed in the clamshell of the handle 4 and is accessible to a user and is located immediately below the trigger button 12. In normal conditions, the finger pad 42 is biased to the bottom end 34 of the casing (downwardly in FIG. 1), the latch 44 of the slider 30 being located entirely within the casing 28. In order to use the power tool, an operator sets the mode switch 10 to an appropriate mode of operation 14, 16, 18 and then depresses the trigger button 12 to activate the rotary hammer. Upon release of the trigger button 12 which is biased outwardly by a spring (not shown), the rotary hammer is deactivated. However, when the trigger button 12 is depressed, the operator can then slide the slider 30 within the casing 28 by sliding the finger pad 42 towards the top end 46 of the casing causing the latch 44 to project from the casing 28 and engage with the trigger button 12. When the finger pad 42 and hence slider 30 are at their maximum top position, the operator can release the trigger button 12 which engages with the latch 44 and thus is held in a depressed position and hence the rotary hammer is "locked on". The slider 30 is prevented from returning to its bottom-most position by the force acting on the latch 44 by the trigger button 12 due to the biasing spring acting on the trigger button and a small ridge formed at the end of the latch 44.

The latch mechanism 26 is capable of being operated when the rotary hammer switch 10 is located in any of the three modes of operation 14, 16, 18. A sensor 50 is located adjacent the mode switch knob 10 and detects which mode the rotary hammer is in and communicates this information to the controller 40. When the latch mechanism is operated, the slider 30 disengages from the micro-switch 36 thus sending a signal to the controller 40 that the "lock on" is being activated. The controller 40 then checks to determine what mode of operation the mode switch 10 is in by determining the output signal of the mode switch knob sensor 50. If the sensor 50 indicates that the hammer is in the hammering only mode 18, the hammer is able to continue normal operation. However, if the controller 40 detects that the latch mechanism 26 is being operated and that the rotary hammer is in either the drilling only mode 18 or the combined hammer and drilling mode 16, it automatically switches off the motor 20 and prevents the rotary hammer from being used until either the latch mechanism 26 is deactivated or the rotary hammer is set into the purely hammer mode 18.

In an alternative design, instead of completely switching the motor off, the controller 40 interferes with the running of the motor, possibly by altering at least one of the amperage, the voltage, and the frequency of the electric current to the motor from the values of the amperage, voltage, and frequency supplied by the tool's source of electric current. For example, the motor could be driven at a different speed, such as an extremely slow speed, to indicate to the operator that something is wrong. This can be achieved by introducing a high resistance into the power circuit by the controller 40 when the latch mechanism is operated and the hammer drill is not in the hammer only mode. Alternatively, the controller 40 could alter the drive torque, for example, by reducing it. The electric motor is normally capable of producing a rotational torque sufficient to drive the hammer drill in all of its normal operational requirements. If the drive torque is altered, preferably by being reduced, it would result in the motor slowing or stalling if a torque greater than that which the motor is capable of delivering after its drive torque had been altered, is applied to the motor.

The invention claimed is:

1. A hammer drill comprising:

a motor;

a tool holder capable of holding a cutting tool;

a drive transmission selectably operable in at least one of a first mode of operation and a second mode of operation;

a mode change mechanism connected to the drive transmission and operable for selecting one of the first mode of operation and the second mode of operation of the drive transmission;

a switch which when in a closed position provides power to the motor; and a lock-on mechanism selectably operable to lock the switch in closed position;

a first sensing apparatus producing a first signal indicating the mode of operation of the drive transmission;

a second sensing apparatus producing a second signal indicating the condition of the lock on mechanism; and a controller which receives the first signal and the second signal and wherein, when the first signal indicates that the drive transmission is operating in the first mode, and the second signal indicates that the switch is locked in the closed position, then the controller interferes with the operation of the motor, and when the first signal indicates that the drive transmission is operating in the second mode, and the second signal indicates that the switch is locked in the closed position, then the controller allows normal operation of the motor.

2. A hammer drill as claimed in claim 1 wherein the first mode of operation is one of a pure drilling mode and a combined hammer-drilling mode.

3. A hammer drill as claimed in claim 1 wherein the second mode of operation is a pure hammer mode.

4. The hammer drill as claimed in claim 1 wherein the lock-on mechanism is selectively operable to a first position and a second position, and in the first position the switch is locked in the closed position and in die second position the switch is not locked in the closed position.

5. A hammer drill as claimed in claim 1 wherein the controller interferes with the operation of the motor by switching it off.

6. A hammer drill as claimed in claim 1 wherein the controller interferes with the operation of the motor by altering at least one of the speed of the motor and the drive torque of the motor.

7. A hammer drill as claimed in claim 6 wherein the controller interferes with the operation of the motor by reducing at least one of the speed of the motor and the drive torque of the motor.

8. A hammer drill as claimed in any claim 1 wherein the lock on mechanism includes a latch mechanism selectively operable for mechanically locking the switch in the closed position.

9. A hammer drill as claimed in claim 8 wherein the latch mechanism is selectively positionable to one of a latched position and an unlatched position, and the latch mechanism further includes a spring which biases the latch mechanism toward the unlatched position.

10. A hammer drill as claimed in claim 1 and further comprising a control switch electrically connected in series with the switch and the motor, the control switch positioned by the controller in one of an on position and an off position, and wherein in the off position the motor does not receive electric current.

11. A hammer drill comprising:

a tool housing;

a motor located in the tool housing and connected to a source of an electric current via an electric circuit;

an on/off switch located in the electric circuit in electrical series connection with the motor, and user switchable between an on position and an off position, and when in the on position the switch is able to conduct the electric current to the motor, and when in the off position the switch is unable to conduct the electric current, and the switch is biased to the off position;

a control switch located in the electric circuit in electrical series connection with the motor and with the on/off switch and switchable between a first state and a second state, and in the first state the control switch conducts the electric current at the amperage, voltage, and frequency supplied by the source of electric current and in the second state the control switch alters at least one of the amperage, the voltage, and the frequency of the electric current;

a drive transmission located in the tool housing and mechanically connected to the motor and selectably operable in at least one of a reciprocating mode of operation and a rotary mode of operation;

a mode change mechanism connected to the drive transmission and user operable for selecting one of the reciprocating mode of operation and the rotary mode of operation;

a lock-on mechanism user selectably to one of a locked position and an unlocked position, and in the locked position the lock-on mechanism holds the on/off switch in the on position and in the unlocked position the lock-on mechanism does not hold the on/off switch;

a first sensor connected to one of the drive transmission and the mode change mechanism, the first sensor producing a first signal indicating that the transmission is in one of the reciprocating mode of operation and the rotary mode of operation;

a second sensor connected to the lock-on mechanism and producing a second signal indicating that the lock-on mechanism is in one of the locked position and the unlocked position; and a control circuit which receives the first signal and the second signal and which controls the state of the control switch, and wherein, when the first signal indicates that the drive transmission is operable in the rotary mode, and the second signal indicates that the lock-on mechanism is in the locked position, then the control circuit switches the control switch to the second state; and when the first signal indicates that the drive transmission is operable in the reciprocating mode, and the second signal indicates that the lock-on mechanism is in the locked on position, then the control circuit switches the control switch to the first state.

12. A hammer drill as claimed in claim 11 wherein the control switch is switchable to one of an open position and a closed position and when in the closed position the control switch is able to conduct the electric current to the motor; and when in the open position the control switch is unable to conduct the electric current.

13. A hammer drill as claimed in claim 11 wherein, when the control switch is in the second state, the control switch conducts the electric current that is supplied to the motor with one of the frequency, voltage, or amperage less than the power available from the source of the electric current.

14. A hammer drill as claimed in any claim 11 wherein the lock-on mechanism includes a latch user operable for mechanically latching the on/off switch in the on position, when the lock-on mechanism is in the locked position.

15. A hammer drill as claimed in claim 11 wherein the second sensor is a micro switch.

16. A hammer drill comprising:

a motor;

a tool holder capable of holding a cutting tool;

a drive transmission, capable of operating in one of a hammer only mode, a drill only mode, and a combined hammer-drill mode;

a mode change mechanism which is capable of switching the drive transmission between the hammer only mode, the drill only mode, and the combined hammer-drill mode;

a switch which, when activated, provides power to the motor; and a lock on mechanism which, when activated locks the switch in its activated state to maintain the power to the motor;

characterised in that there is further provided:

a first sensing apparatus which indicates the mode of operation of the drive transmission;

a second sensing apparatus which indicates whether the lock on mechanism has been activated; and a controller which is capable of interfering with the operation of the motor when power is provided to it by the switch and which monitors the signals from the first and second sensing apparatuses and wherein, when the controller detects that the drive transmission is in one of the drill only mode and the combined hammer-drill mode and the lock on mechanism has been activated, then the controller interferes with the operation of the motor; and when the controller detects that the drive transmission is in the hammer only mode and the lock on mechanism has been activated, then the controller does not interfere with operation of the motor.

* * * * *